(12) United States Patent
Zhang et al.

(10) Patent No.: US 10,599,524 B2
(45) Date of Patent: Mar. 24, 2020

(54) BACKUP PERFORMANCE AFTER BACKUP FAILURE

(71) Applicant: Veritas Technologies LLC, Mountain View, CA (US)

(72) Inventors: Shuangmin Zhang, Beijing (CN); Yongguo Yan, Beijing (CN); Xianbo Zhang, Plymouth, MN (US); Kai Li, Beijing (CN); Weibao Wu, Vadnais Heights, MN (US); Shengzhao Li, Shanghai (CN)

(73) Assignee: Veritas Technologies LLC, Santa Clara, CA (US)

( * ) Notice: Subject to any disclaimer, the term of this patent is extended or adjusted under 35 U.S.C. 154(b) by 362 days.

(21) Appl. No.: 15/581,320

(22) Filed: Apr. 28, 2017

(65) Prior Publication Data
US 2018/0314597 A1 Nov. 1, 2018

(51) Int. Cl.
*G06F 16/00* (2019.01)
*G06F 11/14* (2006.01)
*G06F 16/11* (2019.01)

(52) U.S. Cl.
CPC ...... *G06F 11/1451* (2013.01); *G06F 11/1435* (2013.01); *G06F 11/1448* (2013.01); *G06F 11/1464* (2013.01); *G06F 11/1469* (2013.01); *G06F 16/128* (2019.01); *G06F 2201/84* (2013.01)

(58) Field of Classification Search
CPC ............. G06F 11/1469; G06F 11/1435; G06F 2201/84; G06F 16/128; G06F 11/1448; G06F 11/1464; G06F 11/1451; G06F 2201/184
See application file for complete search history.

(56) References Cited

U.S. PATENT DOCUMENTS

| | | | | |
|---|---|---|---|---|
| 6,934,822 B2 * | 8/2005 | Armangau | .......... | G06F 11/1435 711/162 |
| 7,966,293 B1 * | 6/2011 | Owara | ................ | G06F 11/1448 707/654 |
| 8,046,547 B1 * | 10/2011 | Chatterjee | ........... | G06F 11/1461 707/649 |
| 8,190,836 B1 | 5/2012 | Zheng et al. | | |
| 8,364,920 B1 | 1/2013 | Parkinson et al. | | |
| 9,804,934 B1 * | 10/2017 | Natanzon | ............ | G06F 11/1453 |
| 10,185,583 B1 * | 1/2019 | Natanzon | ............ | G06F 9/45558 |
| 10,228,871 B2 | 3/2019 | Patnaik et al. | | |
| 2004/0267835 A1 * | 12/2004 | Zwilling | ............. | G06F 11/1451 |
| 2008/0162590 A1 * | 7/2008 | Kundu | ................ | G06F 11/1471 |
| 2009/0327628 A1 | 12/2009 | Narayanan et al. | | |

(Continued)

*Primary Examiner* — Leslie Wong
(74) *Attorney, Agent, or Firm* — Campbell Stephenson LLP

(57) ABSTRACT

Disclosed herein are methods, systems, and processes to improve backup performance after backup failure. It is determined whether a backup operation is successful. In response to a determination that the backup operation was unsuccessful, backup metadata associated with the backup operation is replaced with snapshot metadata associated with a snapshot that is taken at a first point in time that is prior to initiation of the backup operation. A rolled-back snapshot that permits another backup operation to be performed at a second point in time based on the snapshot metadata is then generated.

20 Claims, 10 Drawing Sheets

(56) References Cited

U.S. PATENT DOCUMENTS

| | | | |
|---|---|---|---|
| 2010/0077160 A1* | 3/2010 | Liu | G06F 3/0482 |
| | | | 711/162 |
| 2013/0054533 A1* | 2/2013 | Hao | G06F 11/14 |
| | | | 707/649 |
| 2014/0089264 A1* | 3/2014 | Talagala | G06F 11/1471 |
| | | | 707/649 |
| 2017/0068469 A1* | 3/2017 | Shankar | G06F 3/0617 |
| 2019/0163382 A1 | 5/2019 | Patnaik et al. | |

* cited by examiner

BACKUP PERFORMANCE AFTER BACKUP FAILURE

FIELD OF THE DISCLOSURE

This disclosure is related to data backup. In particular, this disclosure is related to improving backup performance after backup failure.

DESCRIPTION OF THE RELATED ART

A sparse file is a type of file that can use file system space more efficiently when a given file is mostly empty by writing metadata representing empty blocks to disk instead of the actual empty space which makes up the block, thus using less disk space. The full block size is written to disk as the actual size only when the block contains real data. An application can use a sparse file as a storage device for input/output (I/O) operations.

Certain applications (e.g., database applications such as some relational database management systems (RDBMS)) require synchronous write operations for data integrity. A synchronous write operation does not return until data is stored at least in a kernel's buffer cache and preserves data integrity by flushing data to disk, ensuring that on-disk data is always synchronized vis-à-vis the corresponding kernel buffer(s). Unfortunately, a synchronous write operation drastically slows down backup performance, particularly when data block size is small and persisting data to disk accounts for a large portion of a write operation. What's more, if synchronous write requirements are not honored in these situations, an incremental backup failure (e.g., from power outage, storage system crash, and the like) can lead to data loss and an application may not be able to recover from a backup failure, thus requiring a new full backup—a time and computing resource intensive proposition to say the least.

SUMMARY OF THE DISCLOSURE

Disclosed herein are methods, systems, and processes to improve backup performance after and/or upon backup failure. One such method involves determining whether a backup operation is successful. In response to a determination that the backup operation was unsuccessful, the method replaces backup metadata with snapshot metadata. In this example, the backup metadata is associated with the backup operation, the snapshot metadata is associated with a snapshot, and the snapshot is taken at a first point in time that is prior to initiation of the backup operation. The method then generates a rolled-back snapshot that permits another backup operation to be performed at a second point in time based on the snapshot metadata.

In one embodiment, the method detects that the backup operation is unsuccessful by determining that a tag file exists in a backup share, and if the tag file exists in the backup share, retrieves an identifier of the snapshot by accessing the snapshot metadata, and adds a reference to the snapshot metadata indicating the generation of the rolled-back snapshot.

In another embodiment, generating the rolled-back snapshot includes performing a cross-check operation between the rolled-back snapshot and an application that includes application metadata and requests another backup operation. In this example, performing the cross-check operation includes removing one or more system change numbers from application metadata associated with the backup operation and designating the rolled-back snapshot as a backup destination for a subsequent backup operation.

In some embodiments, the method ignores a synchronous write request generated as part of a previous backup operation by the application, receives a confirmation that the previous backup operation has completed, and upon receiving the confirmation that the previous backup operation has completed, generates a snapshot request to generate the snapshot. In other embodiments, the method writes a file that is part of the synchronous write request into one or more data container files to preserve data locality, determines whether the file has been closed, and in response to a determination that the file has been closed, persists the file to a computer-readable storage medium.

In certain embodiments, the method exports the rolled-back snapshot to the application. In this example, the synchronous write request is generated by the application, and the cross-check operation is performed by the application. The method then performs the subsequent backup operation based on the rolled-back snapshot. In this example, the subsequent backup operation is an incremental backup operation.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
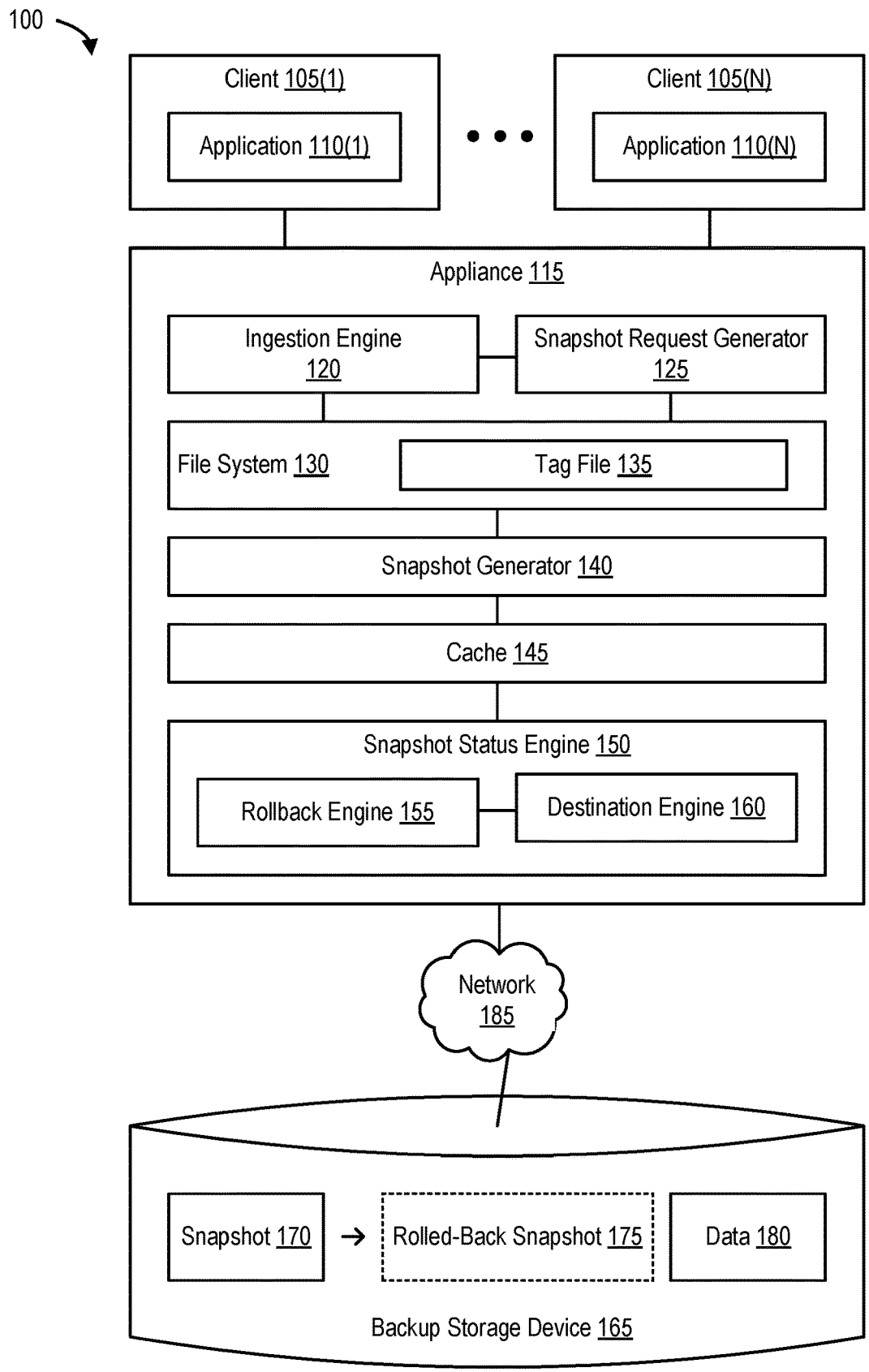
FIG. 1 is a block diagram 100 of a computing system for improving backup performance after backup failure, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A sparse file is a type of file that can use file system space more efficiently when a given file is mostly empty by writing metadata representing empty blocks to disk instead of the actual empty space which makes up the block, thus using less disk space. When reading sparse files, a file system transparently converts metadata representing empty blocks into real blocks filled with zero bytes at runtime. An application (e.g., a database application) is unaware of this conversion. The full block size is written to disk as the actual size only when the block contains real data. As previously noted, an application can use a sparse file as a storage device for input/output (I/O) operations.

Certain applications (e.g., database applications such as some relational database management systems (RDBMS)) require synchronous write operations (e.g., during data backup operations) for data integrity (called synchronous write bias). A synchronous write operation does not return until data is stored at least in a kernel's buffer cache and preserves data integrity by flushing data to disk, ensuring that on-disk data is always synchronized vis-à-vis the corresponding kernel buffer(s).

Unfortunately, a synchronous write operation drastically slows down backup performance, particularly when data block size is small and persisting data to disk accounts for a large portion of a write operation. What's more, if synchronous write requirements are not honored in these situations, an incremental backup failure (e.g., from power outage, storage system crash, and the like) can lead to data loss and an application (e.g., an RDBMS) may not be able to recover from a backup failure, resulting in a corrupted backup image that would require a new full backup—a time and computing resource intensive proposition to say the least.

Disclosed herein are methods, systems, and processes to improve backup performance after backup failure by at least caching data in an efficient manner and recovering a backup destination to a previous backup point in the event of a backup failure.

Example System for Improving Backup Performance after Backup Failure

FIG. 1 is a block diagram 100 of a computing system for improving backup performance after backup failure, according to one embodiment. As shown in FIG. 1, clients 105(1)-(N) execute applications 110(1)-(N), respectively. Each client can execute one or more applications. In one embodiment, applications 110(1)-(N) are database applications such as relational database management systems (RDBMS). Clients 105(1)-(N) are communicatively coupled to appliance 115.

Appliance 115 is a computing device and includes a processor and a memory. Appliance 115 can be any type of computing system including a server, a desktop, a laptop, a tablet, and the like, and is communicatively coupled to a backup storage device 165 via a network 185. However, it should be noted that appliance 115 can also be communicatively coupled to clients 105(1)-(N) and backup storage device 165 via other types of networks and/or interconnections (e.g., a Local Area Network (LAN), a Wide Area Network (WAN), the Internet, and/or the like).

Appliance 115 includes at least an ingestion engine 120, a snapshot request generator 125, a file system 130, a snapshot generator 140, a cache 145, and a snapshot status engine 150. File system 130 includes at least a tag file 135, and snapshot status engine 150 includes at least a rollback engine 155 and a destination engine 160. Ingestion engine 120 performs data ingestion by retrieving and importing data for use or storage (e.g., in a database or in a storage device). Data can be ingested in batches. When data is ingested in batches, data items are imported in chunks at periodic intervals of time. Ingestion engine 120 prioritizes data sources, validates individual files, and routes data items to one or more destinations. Ingestion engine 120 also automatically ingests structured, semi-structured, and unstructured data from multiple sources in a variety of formats. In certain embodiments, ingestion engine 120 executes on an application workload, monitors backup operations, and transmits a backup completion message and/or notification to a daemon process executing on appliance 105.

Snapshot request generator 125 receives a request for a snapshot from ingestion engine 120, for example, upon completion of a backup operation. In one embodiment, ingestion engine 120 detects completion of a backup operation and sends a backup completion message to snapshot request generator 125. A daemon process (e.g., carbond) executing in snapshot request generator 125 triggers a snapshot request to file system 130 and snapshot generator 140 to permit snapshot generator 140 to generator a snapshot. In this example, a snapshot is the state of a recently completed backup at a point in time.

File system 130 includes tag file 135 and is a software program that organizes and controls access to files. Here, file system 130 controls access to the files used by applications 110(1)-(N) stored on cache 145 and/or backup storage device 165. File system 130 can maintain metadata that identifies snapshots, files, directories, and the like, as well as each snapshot's location on a storage device, each file's size, and other information such as the file's creation time, most recent access time, and the like. Such information can be maintained in an inode structure for certain types of files systems.

The term "file system" can refer to both the software application (which itself can be part of an operating system or database) that organizes the files and the collection of files that are organized by that application. Files can be organized hierarchically, with directories collecting groups of files and/or other directories. A file system application like file system 130 can provide another application, such as an RDBMS application, with access to files (e.g., to open, read, modify, create, delete, and otherwise interact with the data within the files).

A file system application such as file system 130 also tracks how the files it organizes map to the blocks of data within backup storage device 165. This way, when an application such as a database requests access to a particular file (e.g., using the file name of the file), the file system can translate that request into a request for the particular blocks of data included in the requested file. Accordingly, file system 130 knows which blocks of data in backup storage device 165 belong to each file.

Each block is a unit of data. In some embodiments, blocks are fixed-size units of data that represent the smallest granularity of data that can be manipulated by the file system application, underlying persistent storage device, and/or operating system. In other embodiments, blocks can be variably-sized, can represent a larger granularity than the smallest representable by the file system, and/or have other, different characteristics than specified here.

In addition to metadata (e.g., file metadata, backup metadata, and the like), file system 130 also includes a tag file. In some embodiments, tag file 135 is part of a backup share (e.g., a backup operation that backs up (ingested) data from multiple applications, databases, and the like). In other embodiments, tag file 135 indicates whether a previous ingest and/or backup operation is successful or unsuccessful. For example, if tag file 135 is placed in a backup share once ingest is started by ingestion engine 120, tag file 135 can be removed when the backup operation completes successfully. However, if the ingest process is aborted or crashes in the middle of a backup operation, tag file 135 is maintained in the backup share (and not removed). Therefore, the presence of tag file 135 in the backup share during a subsequent backup operation indicates that the previous backup operation was unsuccessful.

As previously noted, snapshot status engine 150 includes rollback engine 155 and destination engine 160. Rollback engine 155 generates a rolled-back snapshot and destination engine designates the rolled-back snapshot as a backup destination for future backup operations upon a backup failure. As noted, tag file 135 can be used to determine whether a backup operation is successful. In certain embodiments, in response to a determination that the backup operation was unsuccessful (e.g., tag file 135 is present in the backup share during the subsequent backup operation), snapshot status engine 150 replaces backup metadata associated with a snapshot (e.g., the snapshot generated by snapshot generator 140) with snapshot metadata (e.g., associated with the snapshot). As noted, the snapshot is taken at a first point in time that is prior to initiation of the backup operation. Rollback engine 155 then generates a rolled-back snapshot that permits another (future) backup operation to be performed at a second point in time based on the snapshot metadata by virtue of destination engine 160 designating the rolled-back snapshot generated by rollback engine 155 as the (new) backup destination.

Backup storage device 165 stores a snapshot 170 generated by snapshot generator 140 and/or a rolled-back snapshot 175 generated by rollback engine 155, along with data 180. Backup storage device 165 can include a variety of different storage devices (e.g., HDDs, SSDs, compact discs, digital versatile discs, Flash memory, and/or logical storage devices (e.g., volumes implemented on such physical storage devices)).

Example of Generating a Rolled-Back Snapshot

Figure 2:
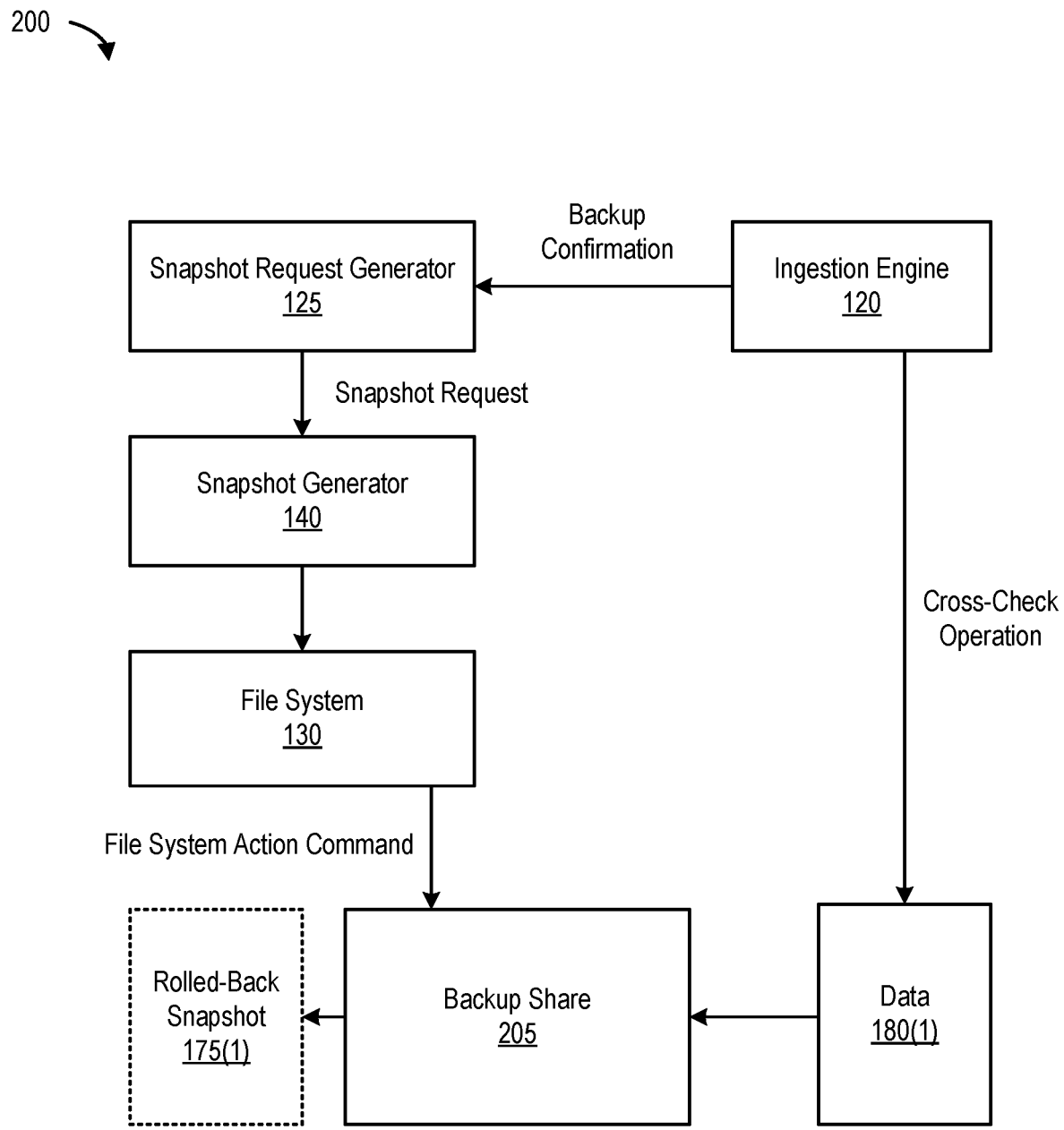
FIG. 2 is a block diagram 200 of a computing system that generates a rolled-back snapshot, according to one embodiment of the present disclosure.

FIG. 2 is a block diagram 200 of a computing system that generates a rolled-back snapshot, according to one embodiment. As previously noted, file system 130 caches data (e.g., in cache 145) for efficient write operations and data placement, and leverages an application's operations to recover a backup destination to a previous backup point in the event of a backup failure. First, when file system 130 receives backup (write) requests with a synchronous flag (e.g., from application 110(1) indicating a synchronous write request requirement), file system 130 ignores the synchronous request and places data into individual file queues and waits for more data prior to persisting data to disk. Data accumulated in different queues is written to different data container files to preserve data locality. Once a given file is closed, the data in the queues is persisted to disk (e.g., to a computer-readable storage medium).

In one embodiment, once a backup operation finishes or is completed, ingestion engine 120 (e.g., an ingestion script that can execute on a given workload) sends a backup confirmation message to snapshot request generator 125 (e.g., a daemon process executing on appliance 115). Upon receiving the backup confirmation message, snapshot request generator 125 sends a snapshot request to snapshot generator 140 (and to file system 130) to permit snapshot generator 140 to generate a snapshot at (this) point in time (e.g., the first point in time). It should be noted that multiple snapshots can be generated for both full and incremental backups (e.g., an incremental merge can be performed after an incremental backup to generate a full backup image). As noted, an unsuccessful backup operation can be detected by the presence of tag file 135 in a backup share 205. If tag file 135 exists in backup share 205, snapshot status engine 150 retrieves an identifier of the snapshot by accessing snapshot metadata, and adds a reference to snapshot metadata indicating the generation of a rolled-back snapshot.

A tag file is created under a file system's metadata directory folder to track "dirty" files (e.g., files that are updated but not flushed or closed) when file system 130 receives an input/output (I/O) request. If an ingest process is shut down after completion of a backup operation, the value in the tag file must be zero. However, if the ingest process is aborted, the value in the tag file will be greater than zero. When the ingest process restarts (e.g., for another backup operation), ingestion engine 120 checks the value in the tag file, and starts a snapshot rollback process to replace the current "broken" backup share if the value in the tag file is not zero. It should be noted that tag file 135 only works for backup share 205 (e.g., a backup destination share) and is not used to generate snapshot 170 and/or rolled-back snapshot 175.

If the value in the tag file is not zero, snapshot status engine 150 retrieves a snapshot identifier from file system 130 (e.g., from system.json that includes information about the current backup share/sandbox, previous start up and/or down time, the previous snapshot, and the like). Snapshot status engine 150 then replaces current metadata (e.g., associated with the current/failed/unsuccessful backup operation) with the snapshot metadata (e.g., previously generated by snapshot generator 140), and adds a reference to the replaced metadata (e.g., thus designating the rolled-back snapshot as the backup destination for future backup operations). In this manner, snapshot status engine 150 generates rolled-back snapshot 175.

However, it will be appreciated that although backup share 205 has been changed to a previous point in time (e.g., rolled-back snapshot 175), an application generating data for backup operations is still operating under the assumption that the latest (failed) backup operation is successful. Therefore, corresponding operations are required on the application-side to permit the application to "forget" about transpired events since the last successful backup. One such operation is a cross-check operation that can be performed on the application-side. For example, because applications such as database applications track what changed data has been backed up by updating corresponding System Change Numbers (SCNs), in one embodiment, destination engine 160 instructs applications 110(1)-(N) to remove one or more SCNs from application metadata associated with the backup operation, and designates rolled-back snapshot 175 as a backup destination for a subsequent backup operation.

When a new ingest/backup request is received, ingestion engine 120 checks whether the current backup share is rolled-back to decide whether such cross-check operation(s) need to be carried out on the application-side to render the application's data change tracking consistent with the current backup share. In this example, such a cross-check operation can be performed between rolled-back snapshot 175 and an application (e.g., an application with application metadata that maintains data change tracking that needs to be harmonized and/or rendered consistent with the rolled-back snapshot of the current/rolled-back backup share).

If the application requests another (incremental) backup operation, snapshot status engine 150 exports the rolled-back snapshot to the application and instructs the application to execute a cross-check script (e.g., RMAN). In this manner, a future/subsequent ingest (e.g., performed as part of an incremental backup operation) can start from a previous point in time (e.g., rolled-back snapshot 175) without incurring data loss (e.g., without requiring a backup operation to be performed from scratch).

Figure 3:
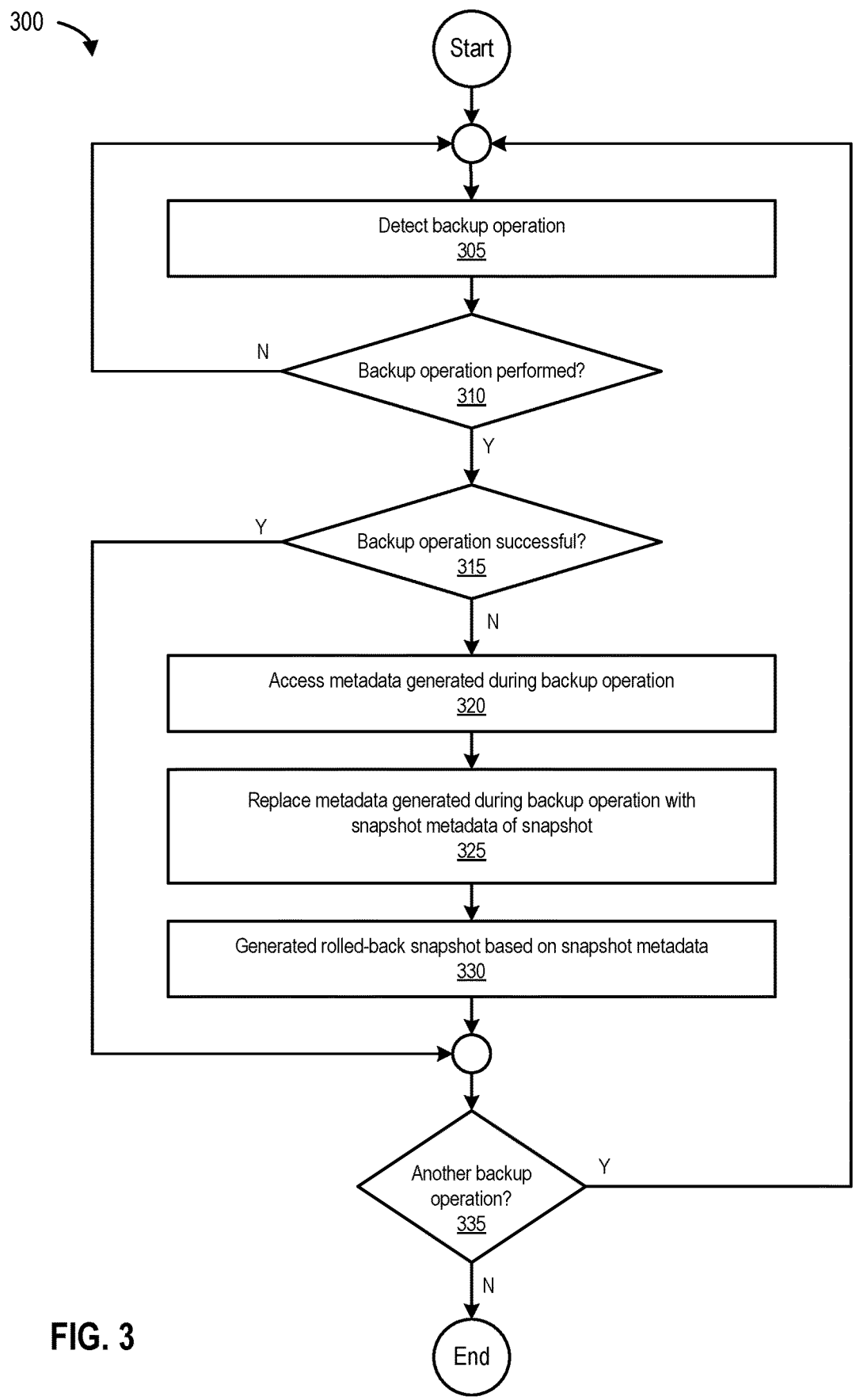
FIG. 3 is a flowchart 300 of a process for generating a rolled-back snapshot, according to one embodiment of the present disclosure.

Example Processes to Generate a Rolled-Back Snapshot and Provide Tracking Consistency FIG. 3 is a flowchart 300 of a process for generating a rolled-back snapshot, according to one embodiment. The process begins at 305 by detecting a backup operation (e.g., using ingestion engine 120). At 310, the process determines whether a backup operation was performed. If the backup operation was not performed, the process loops back to 305. However, if the backup operation was performed, the process, at 315, determines whether the backup operation was successful. If the backup operation was successful, the process loops to 335. At 335, the process determines if there is another backup operation. If there is another backup operation, the process loops to 305. Otherwise, the process ends.

However, if the backup operation was unsuccessful, the process, at 320, accesses metadata generated during the (failed) backup operation. At 325, the process (e.g., using snapshot status engine 150) replaces metadata generated during the backup operation with snapshot metadata of a snapshot (e.g., snapshot metadata generated by snapshot generator 140 at the time of a previous successfully completed backup operation).

At 330, the process generates a rolled-back snapshot (e.g., rolled-back snapshot 175 generated using rollback engine 155) based on the snapshot metadata. At 335, the process determines if there is another backup operation. If there is another backup operation, the process loops to 305. Otherwise, the process ends.

Figure 4:
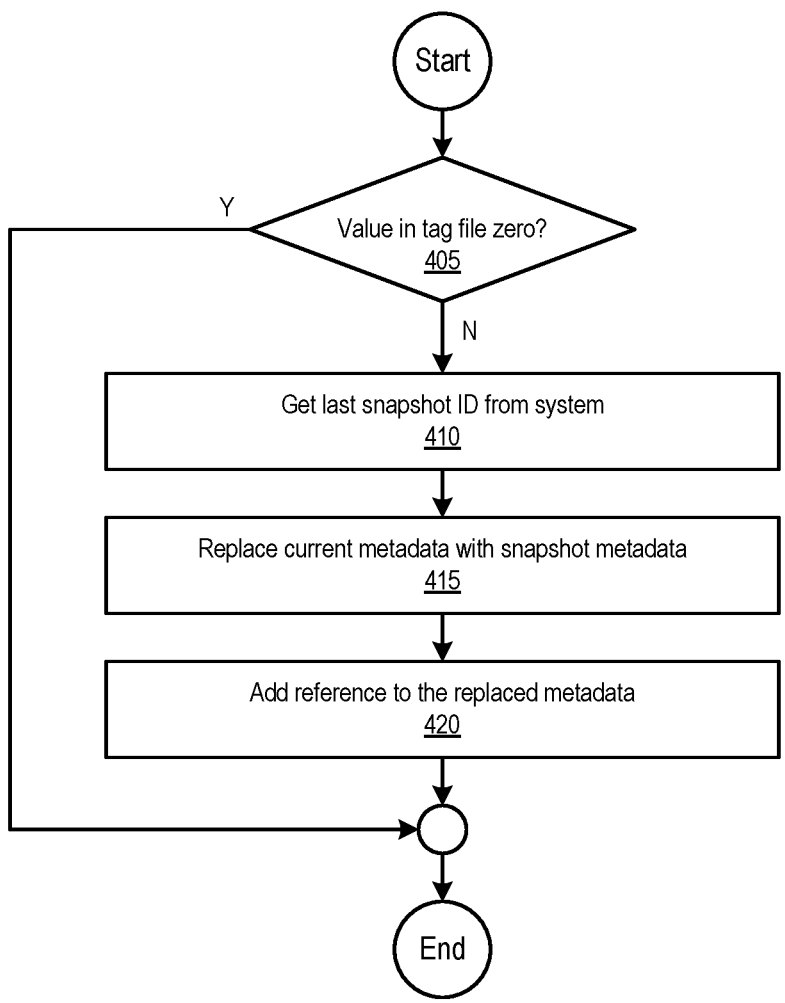
FIG. 4 is a flowchart 400 of a process for determining whether a backup operation is unsuccessful, according to one embodiment of the present disclosure.

FIG. 4 is a flowchart 400 of a process for determining whether a backup operation is unsuccessful, according to one embodiment. The process begins at 405 by determining whether the value in a tag file (e.g., tag file 135) is zero. If the value in the tag file is zero, the process ends. However, if the value in the tag is not zero (e.g., greater than zero), the process, at 410, gets/retrieves the last/previous snapshot identifier from the system (e.g., from metadata maintained by file system 130 located in a metadata directory).

At 415, the process replaces current metadata with snapshot metadata (e.g., using snapshot status engine 150). In this example, current metadata is generated during the current backup. Because the process retrieves the last/previous snapshot ID (e.g., using snapshot status engine 150), the process is able to determine that the current metadata is related to the snapshot metadata (e.g., by following a specific naming pattern, or other such methods). As previously noted, and as will be appreciated, snapshot metadata is generated when data is generated for backup (and is successfully backed up). For example, when a given file is backed up, the file's metadata information such as file size, file modification information, file access time, and the like is generated, and an extent map with the foregoing information is saved (e.g., as part of snapshot metadata).

The process ends at 420 by adding a reference to the replaced metadata. For example, when the process (e.g., using snapshot status engine 150) copies/replaces current metadata with snapshot metadata, adding a reference to the replaced metadata indicates that the replaced metadata is referenced at least twice (e.g., at least by a previous successful backup/snapshot and the current backup). Therefore, it will be appreciated that if a reference count is added for each segment of data that is referenced by the replaced metadata, the data in the backup share (e.g., data 180(1) in backup share 205) is not lost even if the previous snapshot is deleted.

Figure 5:
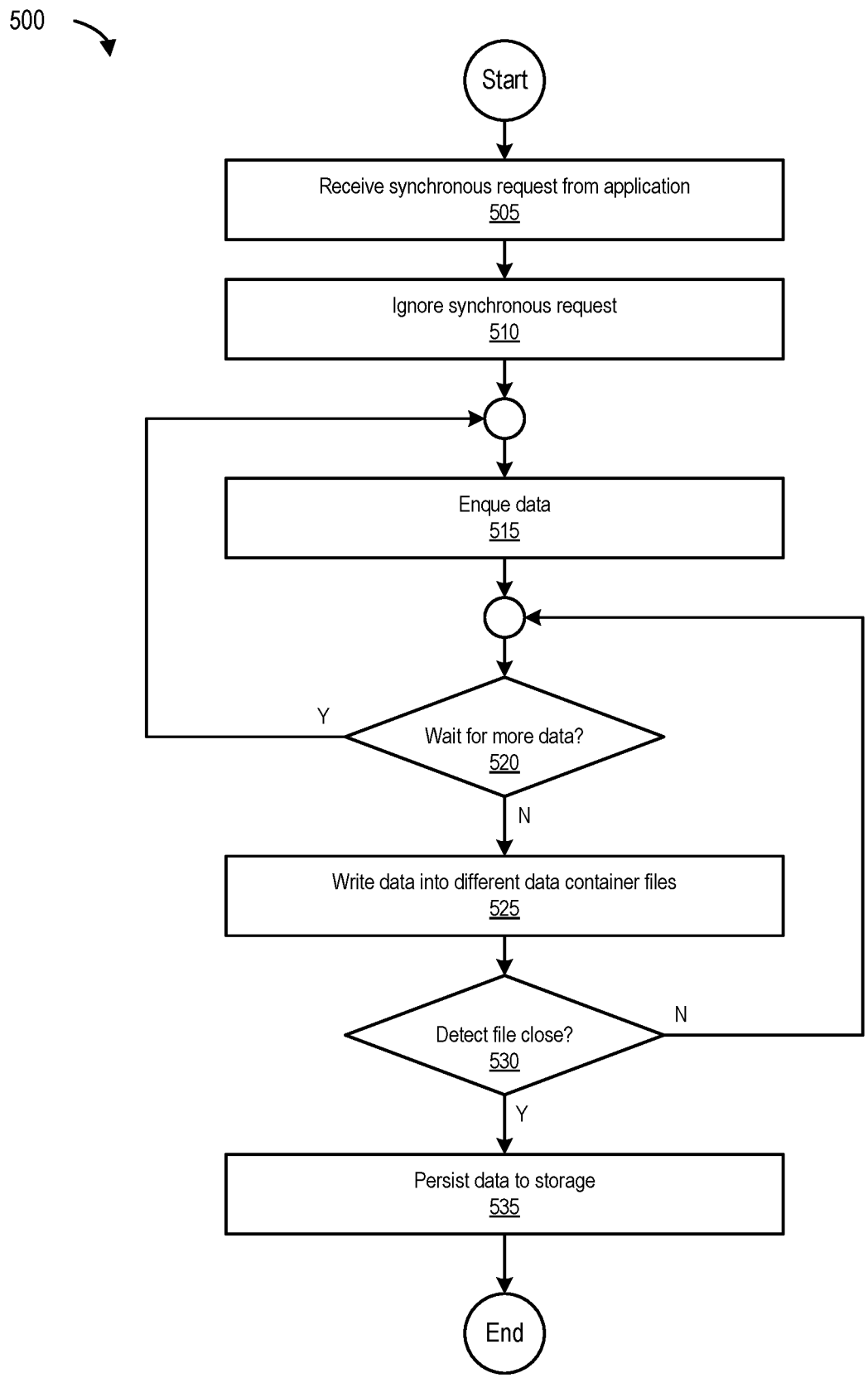
FIG. 5 is a flowchart 500 of a process for persisting data to storage, according to one embodiment of the present disclosure.

FIG. 5 is a flowchart 500 of a process for persisting data to storage, according to one embodiment. The process begins at 505 by receiving a synchronous write request from an application. As noted, certain applications such as some database applications require synchronous write confirmation to maintain data integrity. At 510, the process ignores the synchronous request, and at 515, enqueues data.

At 520, the process determines if waiting is required for more data. If waiting is required for more data, the process loops back to 515. However, is no waiting is required for more data, the process, at 525, writes data into different data container files (e.g., to maintain data locality of various disparate files). At 530, the process determines if a file close has been detected. If no file close has been detected, the process loops back to 520. However, if a file close has been detected, the process ends at 535 by persisting data to storage.

Figure 6:
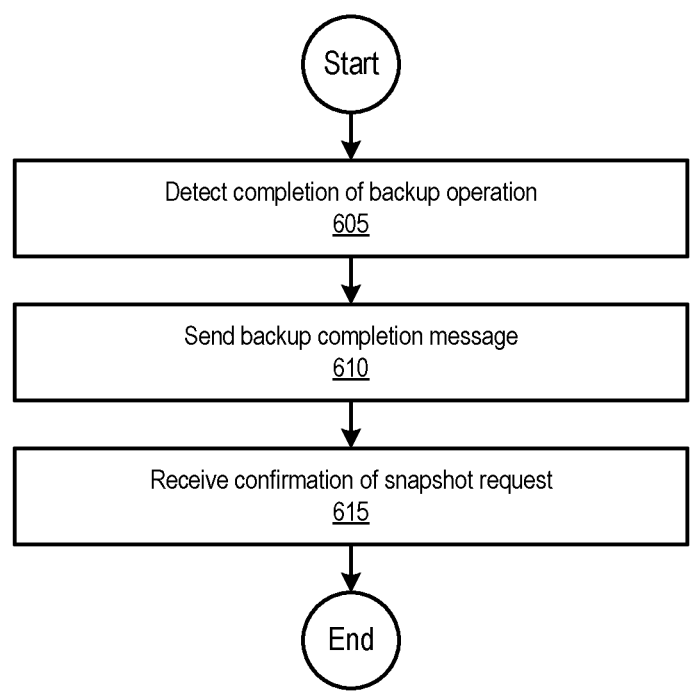
FIG. 6 is a flowchart 600 of a process for generating a snapshot after a backup operation, according to one embodiment of the present disclosure.

FIG. 6 is a flowchart 600 of a process for generating a snapshot after a backup operation, according to one embodiment. The process begins at 605 by detecting completion of a backup operation (e.g., using ingestion engine 120). At 610, the process sends a backup completion (or backup confirmation) message (e.g., to snapshot request generator 125). The process ends at 615 by receiving confirmation of the snapshot request.

Figure 7A:
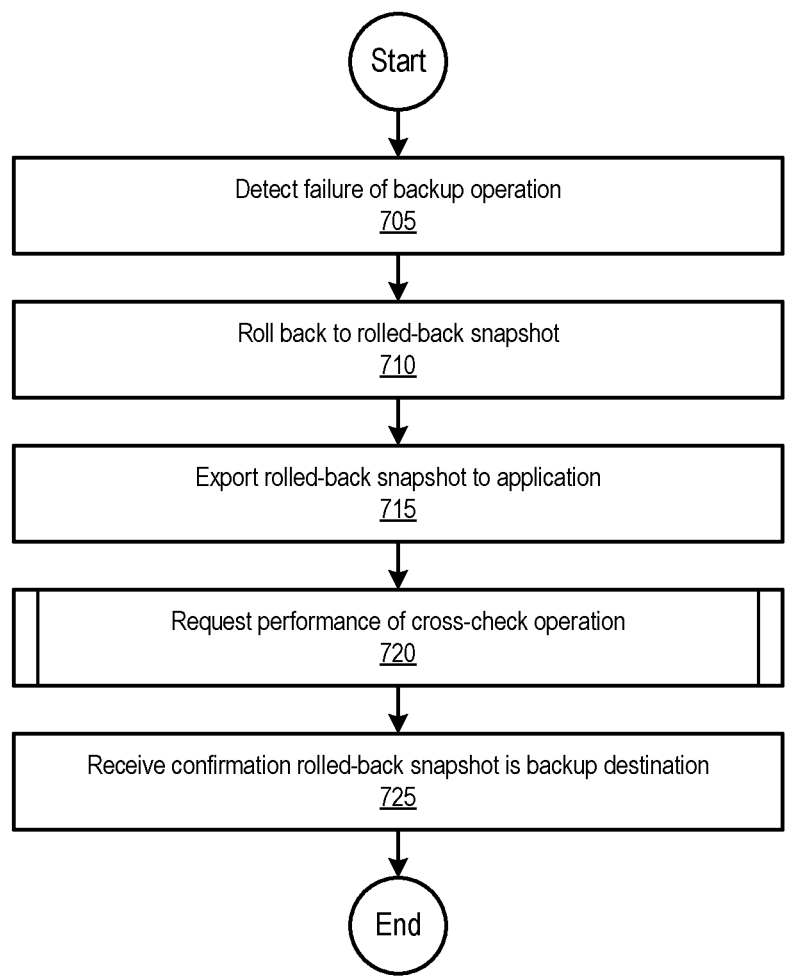
FIG. 7A is a flowchart 700A of a process for designating a rolled-back snapshot as a backup destination, according to one embodiment of the present disclosure.

FIG. 7A is a flowchart 700A of a process for designating a rolled-back snapshot as a backup destination, according to one embodiment. The process begins at 705 by detecting failure of a backup operation (e.g., by detecting the presence of a value greater than zero in a tag file in a backup share such as backup share 205). At 710, the process rolls back to a rolled-back snapshot (e.g., rolled-back snapshot 175 using rollback engine 155).

At 715, the process exports the rolled-back snapshot to an application (e.g., the process exports rolled-back snapshot 175 to application 110(1) using rollback engine 155). At 720, the process requests performance of a cross-check operation (e.g., requests application 110(1) to perform the cross-check operation), and ends at 725 by receiving confirmation that the rolled-back snapshot is the (new) backup destination (e.g., from destination engine 160).

Figure 7B:
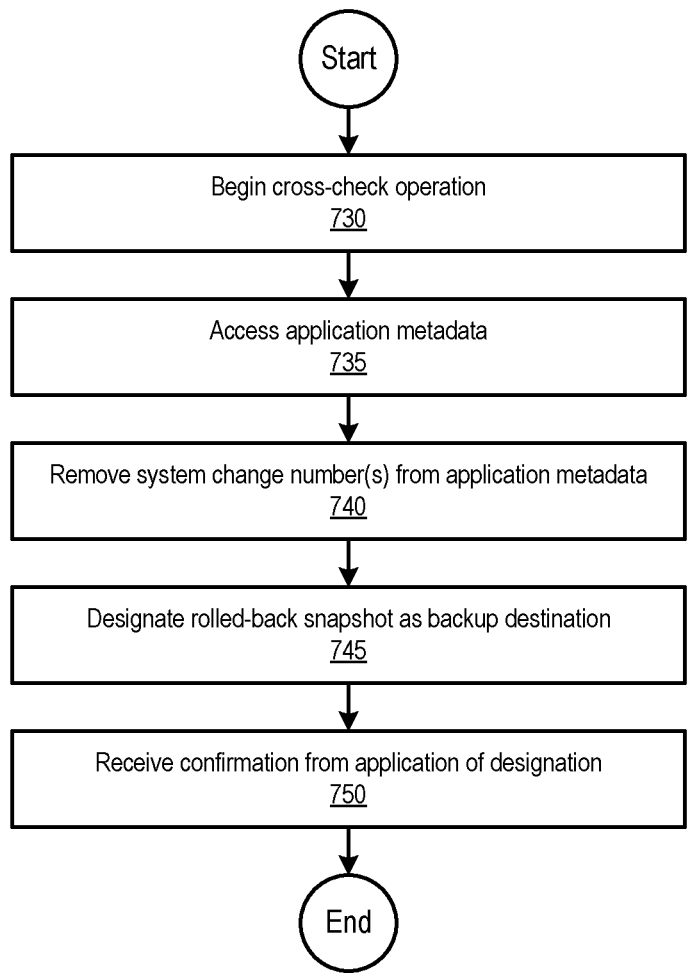
FIG. 7B is a flowchart 700B of a process for performing a cross-check operation, according to one embodiment of the present disclosure.

FIG. 7B is a flowchart 700B of a process for performing a cross-check operation, according to one embodiment. The process begins at 730 by starting the cross-check operation. At 735, the process accesses application metadata (e.g., application metadata that maintains changed data tracking for a given application). At 740, the process removes (one or more) system change numbers from the application metadata (e.g., to provide data change tracking consistency and harmonization between the rolled-back snapshot and the application).

At 745, the process designates the rolled-back snapshot (e.g., rolled-back snapshot 175) as the (new) backup destination (e.g., for future and subsequent backup operations). The process ends at 750 by receiving confirmation from the application of the designation. In one embodiment, the cross-check operation includes at least allocating a channel (e.g., ch00 type disk), cross-checking copy of a database, deleting a no-prompt expired copy of the database, setting a catalog start position the no-prompt, and releasing the channel.

It should be noted that in certain embodiments a tag file is implemented (and can be used) in association with a backup destination share (e.g., backup share 205), and is not used and/or is not necessary to roll-back a given snapshot (e.g., an operation that is performed by snapshot status engine 150). In addition, after replacing current metadata with snapshot metadata, a "new" snapshot need not be created and/or generated based on the "new" snapshot metadata unless a subsequent backup operation is successful because a rolled-back snapshot (e.g., snapshot 170 rolled-back to rolled-back snapshot 175 as shown in FIGS. 1 and 2) can be used to determine a starting point for the subsequent backup operation (e.g., an existing snapshot can simply be rolled-back to replace a current broken backup destination share, for example, if the value of the tag file is greater than zero (e.g., to recovery a database application's backup destination to a previous backup point (in time) in the event of a backup failure).

Therefore, it will be appreciated that the methods, systems, and processes disclosed herein improve backup performance after backup failure by at least caching data in an efficient manner and recovering a backup destination to a previous backup point in the event of a backup failure such that a future ingest as part of an incremental backup operation can start from a previous point in time captured by a rolled-back snapshot without data loss.

Example Computing Environment

Figure 8:
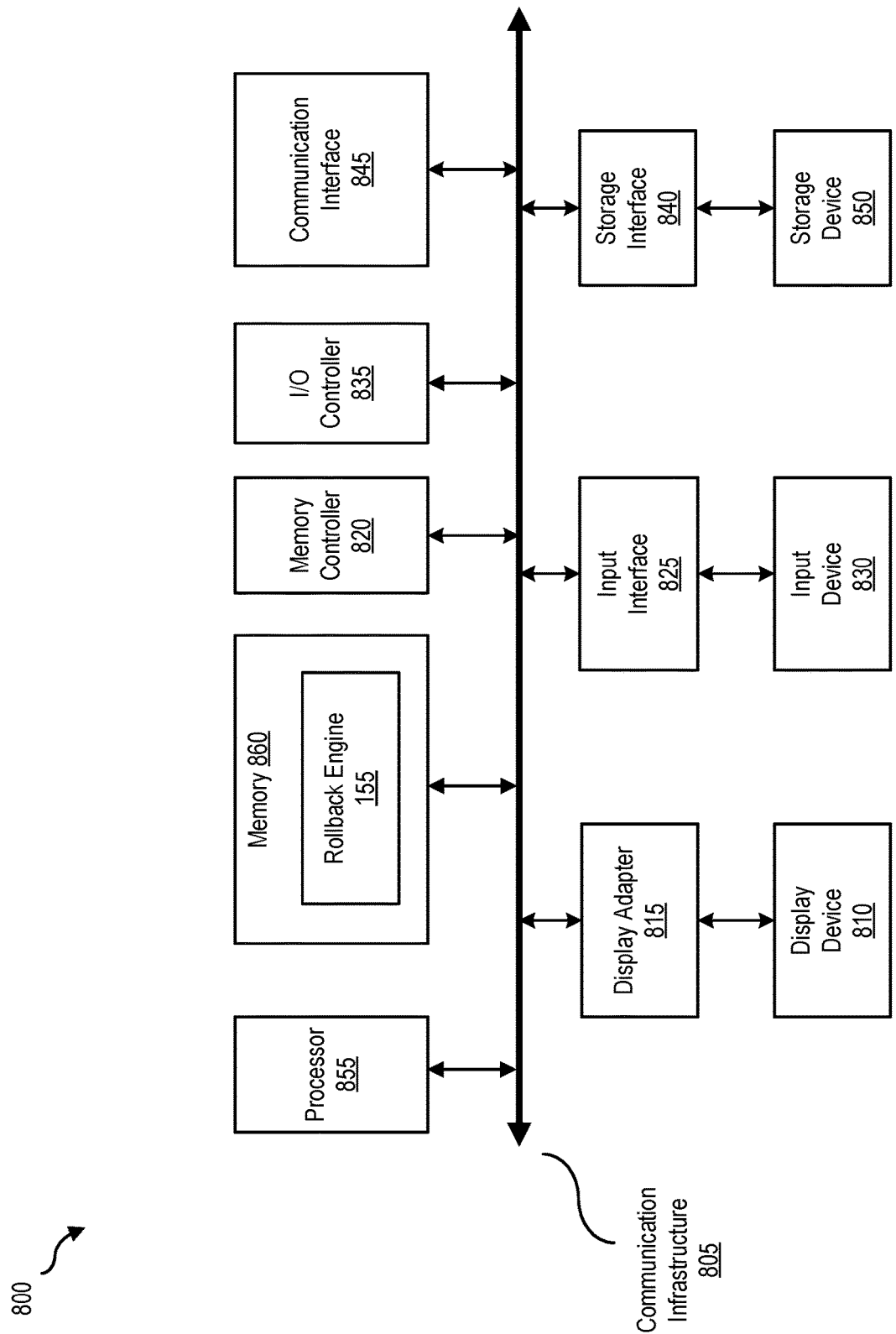
FIG. 8 is a block diagram 800 of a computing system, illustrating how a rollback engine can be implemented in software, according to one embodiment of the present disclosure.

FIG. 8 is a block diagram 800 of a computing system, illustrating how a rollback engine can be implemented in software, according to one embodiment. Computing system 800 can include an appliance 115 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes a rollback engine, computing system 800 becomes a special purpose computing device that is configured to improve backup performance after backup failure.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a rollback engine and/or a destination engine may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850, cache 145, and/or backup storage device 165. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
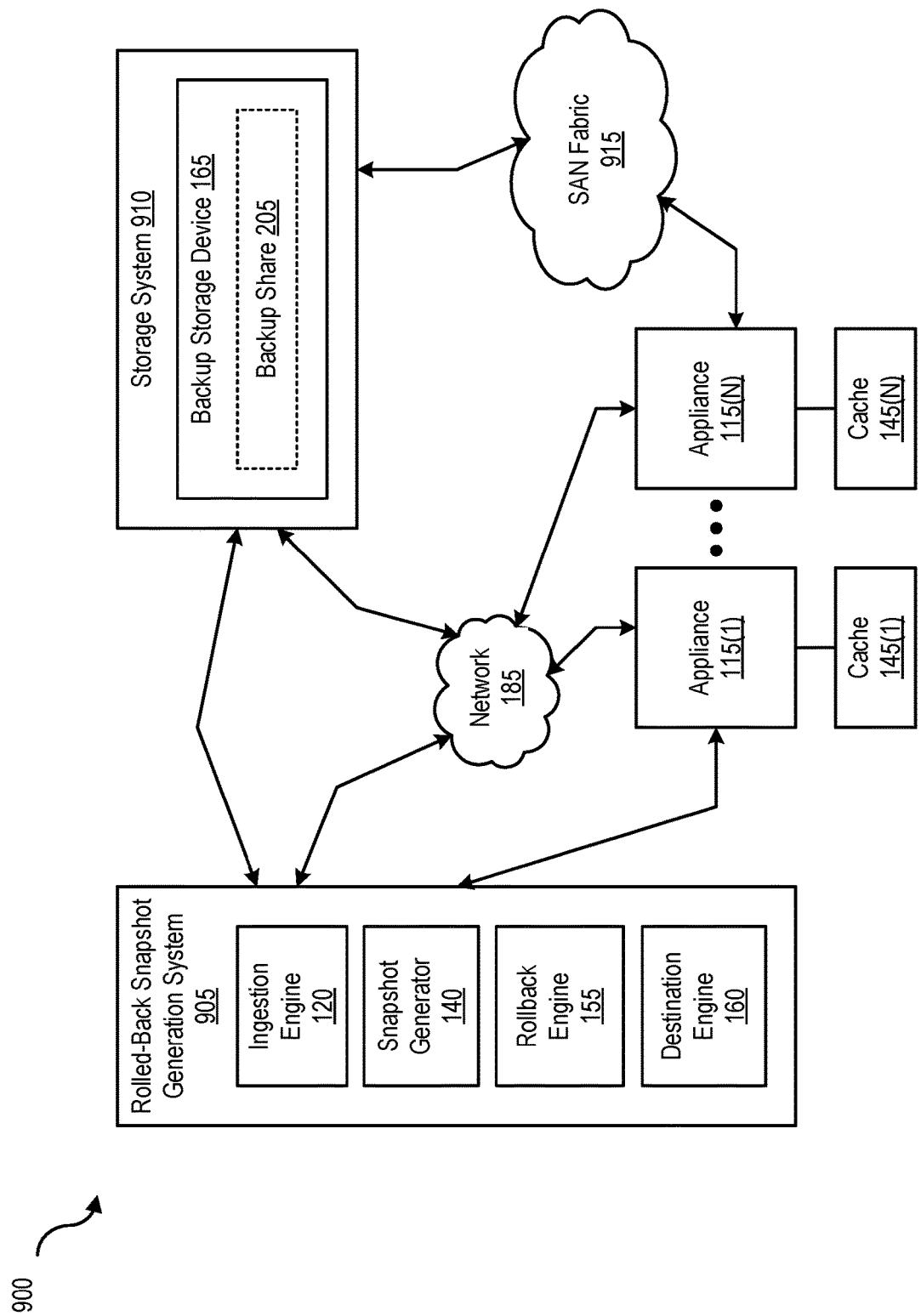
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with appliances 115(1)-(N) such as Network File System (NFS), Server Message Block (SMB), or Common Internet File System (CIFS). Network 185 generally represents any type or form of computer network or architecture capable of facilitating communication between appliance 115, clients 105(1)-(N), and/or backup storage device 165.

In certain embodiments, a communication interface, such as communication interface 845 in FIG. 8, may be used to provide connectivity between appliance 105, clients 105(1)-(N), backup storage device 165, and network 160. Backup share 205 may be part of and may be implemented in backup storage device 165 (as shown in FIG. 9) and/or as part of or in caches 145(1)-(N). The embodiments described and/or illustrated herein are not limited to the Internet or any particular network-based environment.

In some embodiments, network 185 can be a Storage Area Network (SAN). In other embodiments, rolled-back snapshot generation system 905 may be part of appliances 115(1)-(N), or may be separate. If separate, rolled-back snapshot generation system 905 and appliances 115(1)-(N) may be communicatively coupled via network 185. In one embodiment, all or a portion of one or more of the disclosed embodiments may be encoded as a computer program and loaded onto and executed by appliances 115(1)-(N), and/or rolled-back snapshot generation system 905, or any combination thereof. All or a portion of one or more of the embodiments disclosed herein may also be encoded as a computer program, stored on rolled-back snapshot generation system 905, appliances 115(1)-(N), backup storage device 165, and/or caches 145(1)-(N), and distributed over network 185.

In some examples, all or a portion of rolled-back snapshot generation system 905, appliances 115(1)-(N), backup storage device 165, and/or caches 145(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, rollback engine 155 and/or destination engine 160 may transform the behavior of appliances 115(1)-(N) in order to cause appliances 115(1)-(N) to improve backup performance after backup failure.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, implemented in a computer system, comprising:
    generating a snapshot of a prior backup, wherein
        the snapshot is generated at a first point in time, and
        snapshot metadata is associated with the snapshot;
    determining whether a backup operation is successful, wherein
        the first point in time is prior to initiation of the backup operation, and
        the determining comprises
            determining whether a tag file exists, and
            in response to a determination that the tag file exists,
                determining whether the tag file indicates that a file was updated without being persisted to a storage device of the computer system, wherein
                    the file was to be backed up by the backup operation; and
    in response to a determination that the backup operation was unsuccessful,
        replacing backup metadata with the snapshot metadata, wherein
            the backup metadata is associated with the backup operation,
            the replacing the backup metadata with the snapshot metadata facilitates performance of a subsequent backup operation that is based on the snapshot metadata,
            the subsequent backup operation is to be performed at a second point in time, and
            the second point in time is subsequent to the initiation of the backup operation.

2. The computer-implemented method of claim 1, further comprising:
    detecting that the backup operation is unsuccessful by
        determining that the tag file exists in a backup share,
        if the tag file exists in the backup share, retrieving an identifier of the snapshot by accessing the snapshot metadata, and
        adding a reference to the snapshot metadata indicating generation of the snapshot.

3. The computer-implemented method of claim 1, wherein the generating the snapshot comprises:
    performing a cross-check operation between the snapshot and an application that requests the subsequent backup operation.

4. The computer-implemented method of claim 3, wherein
    the application comprises application metadata, and
    the application metadata is associated with the backup operation.

5. The computer-implemented method of claim 4, wherein the cross-check operation comprises:
    removing one or more system change numbers from the application metadata; and
    designating the snapshot as a backup destination for the subsequent backup operation.

6. The computer-implemented method of claim 5, further comprising:
    ignoring a synchronous write request generated as part of a previous backup operation.

7. The computer-implemented method of claim 6, further comprising:
    receiving a confirmation that the previous backup operation has completed; and
    upon receiving the confirmation that the previous backup operation has completed, generating a snapshot request to generate the snapshot.

8. The computer-implemented method of claim 6, further comprising:
    writing a file that is part of the synchronous write request into one or more data container files to preserve data locality.

9. The computer-implemented method of claim 6, further comprising:
    exporting the snapshot to the application, wherein
        the synchronous write request is generated by the application, and
        the cross-check operation is performed by the application; and
    performing the subsequent backup operation based on the snapshot, wherein
        the subsequent backup operation is an incremental backup operation.

10. The computer-implemented method of claim 8, further comprising:
    determining whether the file has been closed; and
    in response to a determination that the file has been closed, persisting the file to a computer-readable storage medium.

11. A non-transitory computer readable storage medium comprising program instructions executable to:
    generate a snapshot of a prior backup, wherein
        the snapshot is generated at a first point in time, and
        snapshot metadata is associated with the snapshot;
    determine whether a backup operation is successful, wherein
        the first point in time is prior to initiation of the backup operation, and
        the program instructions executable to determine comprise further instructions executable to
            determine whether a tag file exists, and
            in response to a determination that the tag file exists,
                determine whether the tag file indicates that a file was updated without being persisted to a storage device, wherein
                    the file was to be backed up by the backup operation; and in response to a determination that the backup operation was unsuccessful,
　　replace backup metadata with the snapshot metadata, wherein
　　　the backup metadata is associated with the backup operation,
　　　the instructions executable to replace the backup metadata with the snapshot metadata facilitate performance of a subsequent backup operation that is based on the snapshot metadata,
　　　the subsequent backup operation is to be performed at a second point in time, and
　　　the second point in time is subsequent to the initiation of the backup operation.

12. The non-transitory computer readable storage medium of claim 11, wherein the program instructions are further executable to:
　detect that the backup operation is unsuccessful by determining that the tag file exists in a backup share,
　　if the tag file exists in the backup share, retrieving an identifier of the snapshot by accessing the snapshot metadata, and
　　adding a reference to the snapshot metadata indicating generation of the snapshot.

13. The non-transitory computer readable storage medium of claim 12, wherein
　generation of the snapshot comprises performing a cross-check operation between the snapshot and an application that requests the subsequent backup operation,
　the application comprises application metadata,
　the application metadata is associated with the backup operation, and
　the instructions executable to perform the cross-check operation comprise instructions executable to
　　remove one or more system change numbers from the application metadata, and
　　designate the snapshot as a backup destination for the subsequent backup operation.

14. The non-transitory computer readable storage medium of claim 13, wherein the program instructions are further executable to:
　ignore a synchronous write request generated as part of a previous backup operation;
　receive a confirmation that the previous backup operation has completed;
　upon receipt of the confirmation that the previous backup operation has completed, generating generate a snapshot request to generate the snapshot;
　write a file that is part of the synchronous write request into one or more data container files to preserve data locality;
　determine whether the file has been closed; and
　in response to a determination that the file has been closed, persist the file to a computer-readable storage medium.

15. The non-transitory computer readable storage medium of claim 14, wherein the program instructions are further executable to:
　export the snapshot to the application, wherein
　　the synchronous write request is generated by the application, and
　　the cross-check operation is performed by the application; and
　perform the subsequent backup operation based on the snapshot, wherein
　　the subsequent backup operation is an incremental backup operation.

16. A system comprising:
　a storage system;
　one or more processors; and
　a memory coupled to the one or more processors, wherein the memory stores program instructions executable by the one or more processors to
　　generate a snapshot of a prior backup, wherein
　　　the snapshot is generated at a first point in time, and
　　　snapshot metadata is associated with the snapshot,
　　determine whether a backup operation is successful, wherein
　　　the first point in time is prior to initiation of the backup operation, and
　　　the program instructions executable by the one or more processors to determine comprise further instructions executable by the one or more processors to
　　　　determine whether a tag file exists, and
　　　　in response to a determination that the tag file exists, determine whether the tag file indicates that a file was updated without being persisted to the storage system, wherein
　　　　　the file was to be backed up by the backup operation,
　　in response to a determination that the backup operation was unsuccessful, replace backup metadata with the snapshot metadata, wherein
　　　the backup metadata is associated with the backup operation,
　　　the program instructions executable by the one or more processors to replace the backup metadata with the snapshot metadata facilitates performance of a subsequent backup operation that is based on the snapshot metadata,
　　　the subsequent backup operation is to be performed at a second point in time, and
　　　the second point in time is subsequent to the initiation of the backup operation.

17. The system of claim 16, wherein the program instructions executable by the one or more processors are further executable to:
　detect that the backup operation is unsuccessful by determining that the tag file exists in a backup share,
　　if the tag file exists in the backup share, retrieving an identifier of the snapshot by accessing the snapshot metadata, and
　　adding a reference to the snapshot metadata indicating generation of the snapshot.

18. The system of claim 17, wherein
　generation of the snapshot comprises performing a cross-check operation between the snapshot and an application that requests the subsequent backup operation,
　the application comprises application metadata,
　the application metadata is associated with the backup operation, and
　the instructions executable to perform the cross-check operation comprise instructions executable to
　　remove one or more system change numbers from the application metadata, and
　　designate the snapshot as a backup destination for the subsequent backup operation.

19. The system of claim 18, wherein the program instructions executable by the one or more processors are further executable to:
　ignore a synchronous write request generated as part of a previous backup operation;

receive a confirmation that the previous backup operation has completed;

upon receipt of the confirmation that the previous backup operation has completed, generating generate a snapshot request to generate the snapshot;

write a file that is part of the synchronous write request into one or more data container files to preserve data locality;

determine whether the file has been closed; and in response to a determination that the file has been closed, persist the file to a computer-readable storage medium.

20. The system of claim 19, wherein the program instructions executable by the one or more processors are further executable to:

export the snapshot to the application, wherein
the synchronous write request is generated by the application, and
the cross-check operation is performed by the application; and perform the subsequent backup operation based on the snapshot, wherein
the subsequent backup operation is an incremental backup operation.

* * * * *